May 3, 1960      A. L. TIRICO      2,935,613

CONTINUOUSLY READABLE DOSIMETERS

Filed Sept. 30, 1952      2 Sheets-Sheet 1

INVENTOR.
ARTHUR L. TIRICO
BY J. H. Grahame
ATTORNEY

United States Patent Office 2,935,613
Patented May 3, 1960

2,935,613

CONTINUOUSLY READABLE DOSIMETERS

Arthur L. Tirico, Glen Ridge, N.J., assignor to Texaco Inc., a corporation of Delaware Application September 30, 1952, Serial No. 312,207

17 Claims. (Cl. 250—83.3)

This invention relates to detectors of penetrative radiation and more particularly to simple integrating types thereof sometimes referred to as dosimeters.

In general a dosimeter must be able to provide an indication of the total amount of radiation which is absorbed by its sensitive detector head over a predetermined and relatively long sampling period, and does not particularly need to be able to provide indications of such additional characteristics of the radiation as moment-to-moment variations in its intensity, its maximum and minimum intensities, etc. This is because of the fact that the physiological damage to human beings which it is sought to avoid by the use of dosimeters depends more on total "dosage" than peak intensity, particularly where the exposure of personnel is not to extremely intense radiation such as that which occurs in the vicinity of an atom bomb explosion, but to relatively weak "natural" and leakage radiation such as that which escapes respectively from uranium deposits and atomic piles.

Although many kinds of radiation detectors can integrate over sufficiently prolonged periods to serve as dosimeters, e.g., a scintillometer whose indicator is a veeder counter, most of them have additional, very-expensively-attained capabilities, e.g., the ability to detect very subtle differences in radiation intensities over very short periods of time, which capabilities are not needed, and therefore cannot be put to profitable use, if these detectors are employed as dosimeters. Because of this special relatively-simple types of detectors have been devised to serve as dosimeters.

A typical prior art dosimeter usually comprises an element which undergoes some sort of change, upon exposure to radiation, which is cumulative as the exposure is prolonged and which can itself serve (or be made to serve) as the indicator of dosage. For example: (1) one kind of lapel dosimeter comprises a piece of radiation-sensitive material, such as photographic film, which is wrapped in a protective cover to prevent its being affected by low energy radiation, e.g., ordinary ambient light, and which can be developed after a prolonged period of exposure and then directly inspected visually to determine the extent to which it has darkened; (2) one kind of breast-pocket dosimeter consists of a vial containing a fluid which changes color as a result of exposure whereby a person who is wearing it can look at it from time to time to judge for himself if the change in color be excessive according to standards with which he is familiar; and (3) certain other dosimeters consist essentially of a quantity of a material, such as one of certain appropriate alkali halides, which undergoes a cumulative darkening and/or discoloration upon prolonged exposure which can be visually observed and evaluated, this usually being done with the aid of an optical instrument such as a colorimeter inasmuch as the changes are usually rather subtle.

One disadvantage of prior art dosimeters is that they are not continuously readable, for example, a film-type lapel dosimeter actually can only be read once, i.e., when it has been developed, and never again thereafter, while an alkali halide crystal can only be read (with acceptable accuracy) when the rather complex instruments which are needed are not otherwise engaged and therefore can be allotted to the task. Another disadvantage is that the reading of prior art dosimeters involves the exercise of judgment.

Accordingly it is an object of the present invention to provide improved dosimeters which are continuously readable and/or provide the dosage information in a form which is subject to but a single interpretation, i.e., does not have to be derived from the indicator through an evaluation process involving judgment.

In general, these objects are attained by employing an element which is subject to cumulative change, such as a darkening and/or discoloration, upon prolonged exposure to radiation as a means for controlling an indicator, such as a meter having a movable needle and a scale directly calibrated in dosages, which is both continuously readable and is so readable without being subject to a variety of interpretations. In certain preferred embodiments the radiation-sensitive element is made to control the transmission of light from a source thereof to a photoelectric light detector to the end that the light detector can then correspondingly actuate a current meter. A difficulty which has prevented the use of this type of arrangement is that the exposure of the element to light needed to enable it to be used as a light "valve" has a relatively strong bleaching effect on its discoloration. Thus when light irradiation of some alkali halides is impressed on them, after they have already been darkened or discolored, it has the effect of relatively quickly restoring them to their original translucencies. Because of this, if these materials are simultaneously irradiated with both light and penetrative radiation the tendency for increments of darkening or discoloration to be caused by the latter and to accumulate thereby effectively integrating the total absorbed dosage will easily be overcome by the former. This difficulty has been met according to the present invention by providing the light (from the source thereof) as impulses which, though they may have relatively high peak intensities, are of very short durations and have very low occurrence rates whereby the total light energy absorbed by the element is negligibly small. In such an arrangement the output of the light detector is applied to a peak-reading vacuum tube voltmeter to achieve effectively the same result as might be achieved by using continuous light of the same intensity as the peak intensity of the impulses and connecting the detector to direct-current D'Arsonval meter.

Figure 1:
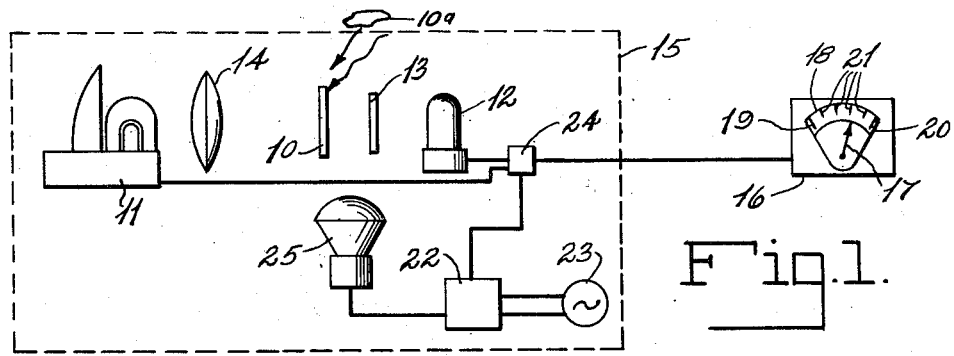
Fig. 1 is a diagrammatic representation of a dosimeter embodying the present invention.
Figure 2:
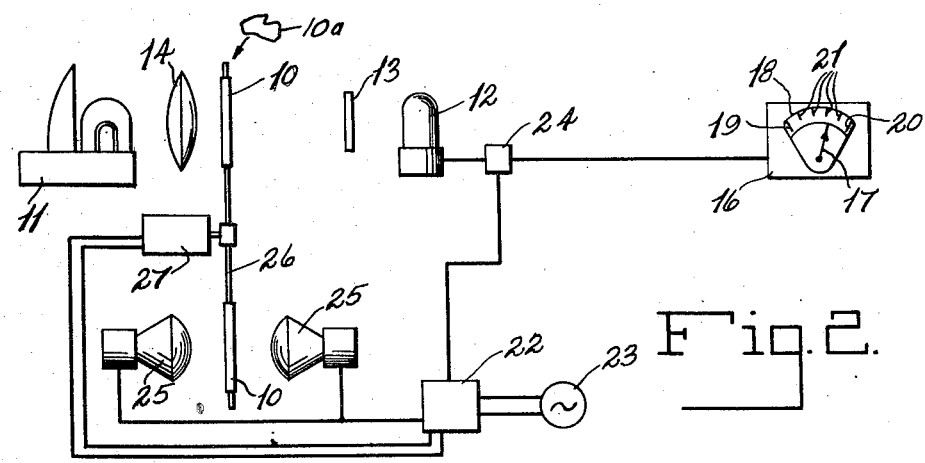
Figs. 2 and 3 are diagrammatic representations of the Fig. 1 dosimeter modified to eliminate interruptions in operation during resettings.
Figure 3:
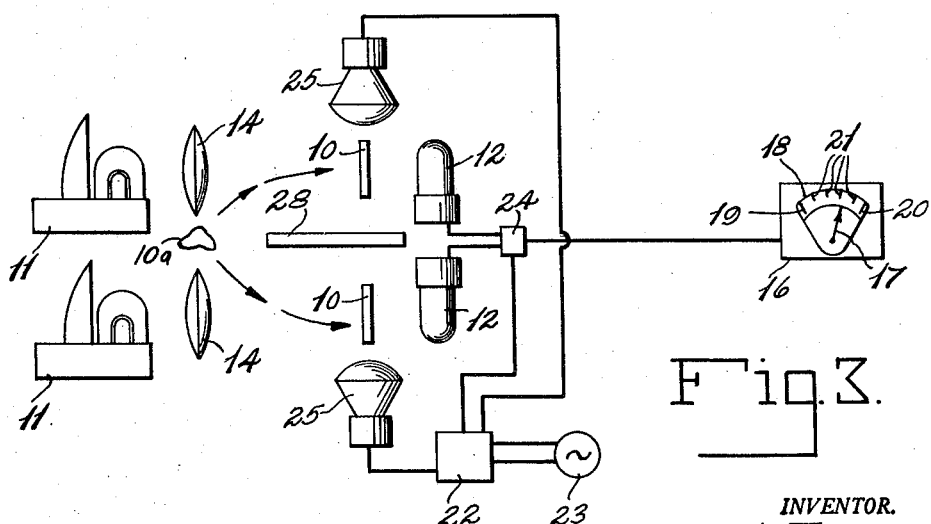
Figure 4:
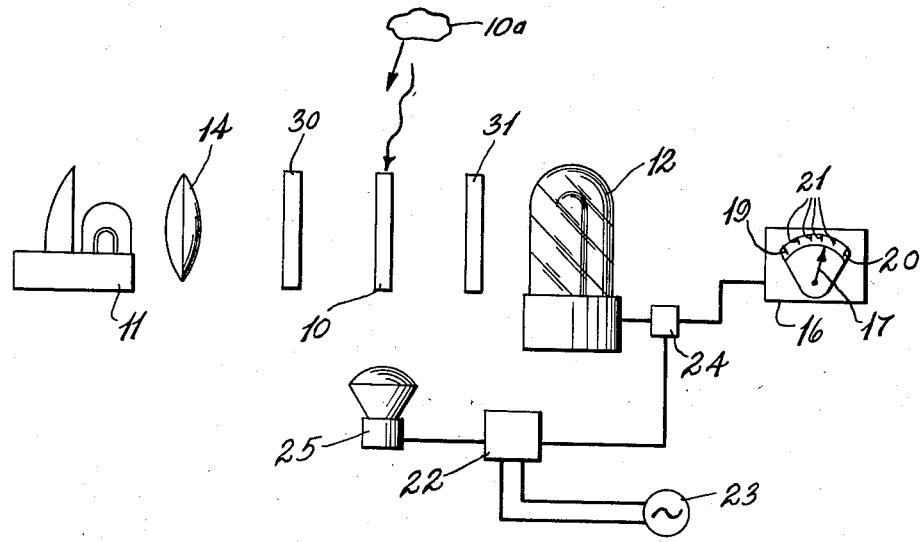
Figure 5:
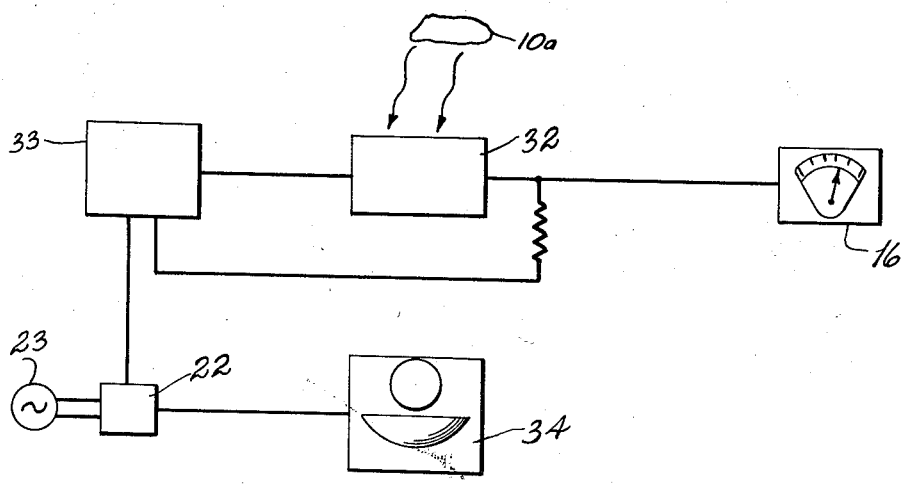

Fig. 4 is a diagrammatic representation of the Fig. 1 dosimeter modified by the use of a different type of radiation-actuated light valve; and Fig. 5 is a diagrammatic representation of a dosimeter embodying in a different manner, than in the Figs. 1–4 embodiments, one of the principal broad features of the present invention, namely that of applying low duty-cycle pulses of high peak-level energy to a radiation responsive element which serves in the dosimeter as a valve for controlling the transmission of that energy from the source thereof to a detector thereof.

The dosimeter shown in Fig. 1 has as its detector head a light-valving element 10 comprising a material or mixture of materials which progressively darkens and/or discolors upon prolonged exposure to penetrative radiation from a source 10a. The material or mixture in question may be chosen from the very great number thereof which are already well known in the art or from others which may become known in the future, due consideration being given, of course, to the conditions under which the dosimeter is expected to operate. Thus if the dosimeter is to be exposed to very intense radiation, for example by being mounted part way within a shielding complex surrounding a reactor pile wherein the absorption of certain relatively high dosages by this monitoring equipment will indicate that personnel stationed outside of the shielding should not be absorbing more than tolerable dosages, then the material may be one of the less sensitive alkali halides such as NaCl and KBr. However if, on the other hand, it is to be exposed to very weak radiation, then the material may be: (1) a mixture of $CHCL_3$ and a purple dye which is described in a release by the U.S. Navy, Bureau of Ships, in the Atomic Energy Newsletter 4, 3 of January 10, 1951. As mentioned in that release this material may be carried in a small glass container as a dog-tag dosimeter and it will turn bright yellow when bombarded by gamma rays; or (2) the silver-activated phosphate base glass which, as disclosed by the U.S. Navy Medical Institute in the Chemical Engineering News 29, 531, in 1951, was devised to be worn as a personnel badge and responds to radiation by being converted to a phosphor which emits orange color light under ultraviolet excitation.

The element 10 is mounted athwart a light transmission path between a light source 11 and a light detector 12. The source 11 is chosen to provide light which has a sufficiently high peak intensity to easily rise above the noise level of the detector 12 and sufficiently low average intensity to minimize the absorption of light by the element 10, inasmuch as such absorption has the undesirable side effect of tending to "bleach out" any darkening and/or discoloration of the element (one "F-center" being destroyed for every quantum of light absorbed) and of thereby tending to prevent the integrating effect necessary to determine total dosage. To this end the source 11 is adapted to produce impulses of light which have a relatively high peak intensity, a very short duration and a relatively low occurrence rate. Certain light sources (stroboscopic lights) which are particularly suitable for this purpose and which are well known in the photographic arts, are of a type comprising a gas-filled discharge tube and a circuit for periodically energizing it with short-duration, high-voltage electrical pulses. However there are other types of sources which may also be used, such as one comprising a continuous light source, e.g., an incandescent lamp or an arc light, and a mechanically driven chopper which may consist of two counter-rotating discs each having a small orifice which registers with that of the other and with the optical path from the continuous light source to the light detector doing so, say once for every revolution of each disc.

The light detector 12 is positioned at the termination of the light transmission path which starts at the source 11 and extends through the element 10. In some embodiments the detector may be a rather simple photoelectric device such as (1) a diode having a photoemissive cathode, or (2) a photo-sensitive transistor. However where an extremely sensitive detector is needed because the light modulations effected by the element 10 are of very small magnitude, a photo-electron multiplier tube may be used instead. Provision is made herein for optimizing both the sensitivity of the element 10 and its ability to integrate.

Its sensitivity is increased by utilizing as the light which is to be valved by the element 10 only components which lie in the spectral band for which the element acquires increasing absorption capabilities as it darkens and/or discolors. Consider the case of an element 10 which comprises a crystal of LiF. In this material the F-centers which develop as a result of exposure to penetrative radiation are ones which have their highest absorption for light in the spectral region between 2100 and 3400 angstrom units. Therefore if the light provided by the source 11 were to include a substantial portion comprising components outside of that range, the transmission of that portion to the detector 12 would be entirely uninfluenced by any darkening and/or discoloration of the element 10. This would produce a D.C. component in the light detector which not only would be useless with respect to its having any signal content but in addition might adversely affect the sensitivity of the light detector by causing it to operate on an unfavorable part of its characteristic curve. Moreover, as is generally true where a small signal component is superimposed on a large D.C. component, the intelligence content of the former may be deleteriously affected by spurious variations in the latter. Accordingly in such a case the source preferably should be made to provide light whose components are in the same spectral region as that in which the absorption centers of the element 10 are effective. This may be accomplished in a variety of ways all of which are well known. For example, by proper selection of the filling of a gas-filled discharge tube where a stroboscopic light is used, or by the use of optical filters to eliminate unwanted components where a wide band source is used, or by both. Where an optical filter is to be used it will be feasible to position it any place between the source 11 and the detector 12, i.e., either on the input side of the element 10, or on its output side (as in the case of the filter 13 shown herein). In the Fig. 1 embodiment a condensing optic 14 is employed for gathering a substantial amount of the light emitted by the source 11 and concentrating it usefully toward the detector 12 through the element 10 and the filter 13. Of course, if desired, it will be possible for this optic to be made of material such as colored glass so that it can act as a filter to serve the purposes mentioned above at the same time that it serves as a converging optic.

In order to minimize any accidental bleaching out of the absorption centers from the element 10, since this would tend to oppose the performance of its integrating function, the entire apparatus is surrounded by a closure 15 which is designed to keep out ambient light and also, to as great an extent as possible, ambient heat. Thus the closure 15 may consist of a box of material which will not transmit light, i.e., opaque material such as metal, and which may even have polished outside surfaces to minimize absorption thereof and its resultant conversion into heat, by reflecting it away. While it should not be necessary in most embodiments, it is also within the scope of the invention to refrigerate the interior of the closure 15 to maintain it at a predetermined low temperature independently of the ambient temperature or changes therein.

The output of the detector 12 is applied to an indicator 16 which may be of the same general type as a peak-reading vacuum type voltmeter having a pointer (or "needle") 17 which is movable along a scale 18 and thereby positionable with respect to the scale calibrations to produce unambiguous indications. Since the deflection of the pointer 17 will progressively diminish, during each period of exposure of the dosimeter, it should be "zero set" at the start of the period to be in alignment with the full scale deflection calibration mark (19). At the same time the indicator may be switched to a suitable sensitivity scale for obtaining a full scale decrease in the deflection of its pointer 17, i.e., a full scale counter-clockwise movement thereof, after exposure to a maximum safe dosage. Accordingly, the scale may include a suitable calibration mark (20) beyond which the pointer should not move by or before the end of the period of exposure. In addition the scale may bear other calibrations (21) beyond which it should not move by or before the end of predetermined fractions of that period.

After the termination of the period of exposure it will be possible immediately to reset the dosimeter by replacing the element 10 with a new one or an old one which has been bleached out and thereby restored to its original condition. Thus, by having a number of interchangeable elements 10, it will be possible to use all of the other components of a dosimeter substantially continuously, any element 10 which has been replaced being either thrown away after serving its purpose during a single period of exposure or being bleached out (by exposure to light or heat or in any other suitable way) to prepare it for service during a subsequent period. However, since it will suffice for many applications if the continuous operation of the dosimeter extends over only a portion of each calendar day, e.g., from 8 a.m. to 5 p.m., it is possible to provide the rather simple means shown in Fig. 1 for automatically resetting the dosimeter during all or part of the idle time between its periods of operation. In this illustrative example it comprises a clock-driven switching mechanism 22 which may be connected to an A.C. power source 23 for energizing both the mechanism 22 and the devices which it controls. One of these devices is a normally-closed relay 24 which is energized from the source 23 by the mechanism 22 at the end of each period of exposure to disable the output circuit of the detector 12 and to turn off the light source 11 and the other is a source of red light 25 which is similarly energized at the same time to flood the element 10 with light of wave lengths most suitable for restoring it to its original color and/or translucency.

The Fig. 2 embodiment is a modification of that of Fig. 1 wherein provision is made for continuous round-the-clock operation of the dosimeter without substantial interruptions for the purpose of resetting. To this end a plurality of elements 10 are provided and are mounted on a disc 26 which is automatically rotatable under control of the mechanism 22 to move a fresh element 10 into operating position between the source 11 and the detector 12 at the end of each period of exposure and at the same time to move the most recently exposed element 10 into position between a pair of light sources 25 where it can be bleached out in preparation for a subsequent period of exposure at the start of which the disc 26 will move it into operating condition in the dosimeter. A mechanical driving means is represented in Fig. 2 by a block 27. It may consist of an electrical motor combined with a gear reduction, a Geneva movement and a limit switch in any one of a variety of suitable ways well known to the art, to respond to the actuation of a starting switch in the mechanism 22 to rotate the disc 26 through a predetermined angular distance and to reset the starting switch.

The Fig. 3 embodiment is another modification of that of Fig. 1 in which provision is made for continuous operation of the dosimeter without substantial interruptions for resetting and wherein resettings are accomplished without physically moving any of the component parts of the dosimeter with respect to any other. As will be readily apparent from the showing of Fig. 3 this dosimeter comprises duplicate sets of some of its components arranged to take turns in feeding information to a common indicator 16 and to permit the one element 10 (of a set of two thereof) which is idle during any period of exposure to be irradiated with light of appropriate wave lengths to bleach it thereby preparing it for operation during the next period. A shield 28 is provided between the elements 10 so that only one of them at a time will be subjected to bleaching.

The embodiment of Fig. 4 is a modification of that of Fig. 1 in which the effectiveness of the element 10 as a valve is based on the ability of its F-centers to shift the polarity of some of the rays of light from the source 11 rather than on their ability to absorb them. In order to utilize this effect two plane polarizing filters 30 and 31 are mounted along the light path between the source 11 and the detector 12 and on opposite sides of the element 10 and with their planes of polarization in quadrature space relationship. Normally, therefore, no light from the source 11 will be able to reach the detector 12 inasmuch as the filter 31 will not pass light of the particular (only) polarization which will reach it from the filter 30. However, any ray which sustains a 90° shift in polarization in passing through an F center of the element 10 will be able to pass through the filter 31 and thus to reach the detector 12 and thus this element can function as a valve.

The apparatus shown in Fig. 5 embodies in another way the broad underlying principle of the present invention of applying low duty cycle pulses of high peak-level energy to an element which serves in the dosimeter as a valve for controlling the transmission of that energy from a source thereof to a detector thereof. In this different way of embodying this principle the light-valving element 10 is replaced by a radiation-responsive electrical current valve 32, i.e., a crystal of photo-conductive material, the source of light impulses 11 is replaced by a generator of electrical pulses 33 and the light detector 12 is dispensed with since the output of the valve 32 can be made directly to actuate a (peak reading) voltmeter. This apparatus can be effective as a dosimeter because of the fact that the valve 32 will pass larger current impulses, for each applied electrical pulse, as it is progressively "activated" as a result of absorption of penetrative radiation (see the article by R. S. Alger, Journal of Applied Physics, vol. 21, No. 1, 30–36, January 1950 and in particular the apparatus shown in Fig. 1 on page 31). However, as is known, when current is drawn through a photo-conductor of this type its F-centers act as charge carriers and therefore are swept out. Therefore, they may be eliminated, in much the same way as F-centers may be bleached out of the elements 10 shown herein as an incidental effect unavoidably incurred in connection with the valving function. Therefore, provision is made, according to the present invention, for avoiding such large scale sweeping out of F-centers as to prevent the integration needed for dosimetry, by energizing the circuit feeding the indicator 16 with electrical pulses having a very short duration, and very low duty cycle. A current-boosting light source 34 may be used for irradiating the valve with light pulses in simultaneous synchronism with the electrical pulsing of the generator 33 to increase the sensitivity of the valve 32 in accordance with the teachings of U.S. Patent 2,604,996. Automatic resetting may be easily achieved by adapting the mechanism 22 to switch the generator 33 and/or the source 34 to operation which is either continuous or of a sufficiently high duty cycle to cause all of the F-centers to be swept out in a relatively short time.

Referring again to the Fig. 1 embodiment it will be understood that where the element 10 comprises a silver-activated phosphate base glass which gamma ray exposure converts to a phosphor then the light source 11 should provide a type of light, such as ultraviolet, which is suitable for energizing the phosphor. In such a case the element 10 will not act directly to valve the light originating at the source 11 but will do so indirectly in a cascade type of operation.

If desired, the duration and pulse occurrence rate of the light impulses provided by the source 11 shown in the Fig. 1 embodiment can be increased to just keep pace with the progressive darkening and/or discoloration of the element 10 for normal dosages. In such a case the zero setting of the indicator 16 should be at a point near the middle of its scale 18 and movements of its needle 17 in opposite directions will be indicative of less than tolerable and more than tolerable dosages respectively.

It is noted that in embodiments in which the element 10 comprises a material which converts to a phosphor in response to a radiation (11 20–26, p. 6 supra) movement of the needle 17 will be toward the high rather than the low end of the scale as the element progressively absorbs an increasing dosage. Accordingly the indicator of such an embodiment should be "zero set" at the mark 19 at the start of an initial period of operation. Moreover, in such an embodiment it is to be preferred that the filter 13 be adapted to reject light of the wave lengths emitted by the source 11 and freely to pass light of the wave lengths produced by the luminescence of the element 10. Thus in a dosimeter in which the source 11 may provide ultraviolet light, this being a particularly suitable type for exciting luminescence, and the element 10 is of the kind mentioned above which is adapted to emit orange-color luminescence, the filter 13 should be selected to reject the shorter wave lengths of the source and freely to pass the longer wave lengths from the element 10.

Obviously, many modifications and variations of the invention, as hereinbefore set forth, may be made without departing from the spirit and scope thereof, and therefore only such limitations should be imposed as are indicated in the appended claims.

I claim:

1. Apparatus for detecting penetrative radiation comprising: a source of energy for actuating an indicator means; indicator means coupled to said source over a predetermined transmission path for receiving some of the energy therefrom to produce an indication proportional to a magnitude parameter of the received energy; and valving means, interposed in said path and variably coupling said source to said indicating means, said valving means being positioned and arranged to receive externally derived penetrative radiation and being adapted and arranged to control the effectiveness of said coupling by progressive internal ionization in response to successive increments of said radiation, whereby said coupling is effective to integrate penetrative radiation received thereby over a predetermined relatively long period of time.

2. Apparatus as in claim 1 in which said valving means comprises a quantity of material which has one side coupled to said source and another side coupled to said indicator means and is capable of transmitting from its said one side to its said other side the type of energy provided by said source, its capability to do so being subject to cumulative change in response to its prolonged exposure to penetrative radiation.

3. Apparatus as in claim 2 in which the energy provided by said source comprises rays of light and the material comprised in said valving means undergoes said cumulative change by developing light absorptive centers in response to its own absorption of penetrative radiation.

4. Apparatus as in claim 3 in which said light absorptive centers produced in said material tend to be eliminated therefrom when it is exposed to light, and in which the light provided by said source is in the form of impulses having a low duty-cycle to minimize the elimination of such centers.

5. Apparatus as in claim 4 further comprising resetting means including a bleaching light source for periodically irradiating said material with light of relatively high intensity as compared to the average intensity of light from said first mentioned source and of suitable wave lengths for eliminating light absorptive centers previously produced in said material by its absorption of penetrative radiation.

6. Apparatus as in claim 5 in which said resetting means also includes means for automatically initiating the irradiation of said material with the high intensity light for a predetermined interval of time after the termination of said predetermined prolonged period and thereafter periodically initiating a succession of cycles of operation each similarly including a prolonged period of absorption of penetrative radiation followed by a predetermined interval of irradiation with bleaching light.

7. Apparatus as in claim 1 in which said source of energy is a source of electric potential, said valving means comprises a quantity of semi-conductor material whose electrical conductivity increases within predetermined limits in response to its absorption of penetrative radiation and thereafter decreased when electric currents are drawn through it, and said source being adapted to provide said electric potential as a train of low duty-cycle pulses of a short duration.

8. Apparatus as in claim 1 in which said valving means comprises an alkali halide in which light absorption centers are developed as a result of its absorption of penetrative radiation and in which such centers, once developed, tend to be "bleached out" as the result of absorption of light; and in which the energy provided by said source is light of insufficient average intensity to eliminate absorption centers therefrom as rapidly as they are produced therein by a predetermined intensity of penetrative radiation and to thereby prevent said valving means from reacting cumulatively to said penetrative radiation.

9. Apparatus as in claim 8 in which the light provided by said source is in the form of pulses having a short duration and a low-duty cycle whereby the peak intensity of the light may be relatively very high despite its low average intensity and in which said indicating means comprises a photoelectric device for receiving light impulses and converting them into electric impulses and means responsive to a peak value of said pulses to produce said indications.

10. A dosimeter comprising: a light source; a photoelectric device; a light-energy coupling valve element positioned between said source and said device to receive light from the former and in response thereto to release light to the latter, said element being adapted and arranged to sustain a cumulative change in its coupling capability by internal ionization in response to prolonged exposure to penetrative radiation whereby the amount of light which it releases to said device depends on its total absorption of penetrative radiation; and an electrically actuated dosage indicator connected to said device and controlled thereby.

11. A dosimeter as in claim 10 in which the light source is adapted to produce light as impulses having a relatively short duration and a relatively low duty cycle and the indicator is responsive to peak values of the electrical output of the photo-electric device.

12. A dosimeter as in claim 10 in which said element comprises a quantity of material in which light absorption centers are developed as a result of its absorption of penetrative radiation, said centers having their greatest absorption for light in a predetermined wave length band; and in which a large part of the light provided by said source is within said wave length band.

13. A dosimeter as in claim 10 in which said element comprises a quantity of material in which light absorption centers are developed as a result of its absorption of penetrative radiation, said centers having their greatest absorption for light in a predetermined wave length band; said dosimeter further comprising a filter having relatively good transmission for light in said band and relatively poor transmission for light outside of it, the filter being interposed between said source and said device.

14. A dosimeter as in claim 10 in which said element comprises a quantity of material which develops an increasing capability to luminesce as a result of its continuous absorption of penetrative radiation and the light provided by said source is in a suitable wave length range for exciting luminescence in said material once it has developed capability to luminesce.

15. A dosimeter as in claim 14 in which a large part of the light produced by luminescence of said material is outside of said suitable wave length range; and further comprising a filter which has relatively good transmission for said large part of the luminescent light and relatively poor transmission for the light provided by said source and is interposed between said material and said photoelectric device.

16. A dosimeter as in claim 10 in which said element comprises a quantity of material, such as the mixture of $CHCL_3$ and a purple dye mentioned herein, which changes color as a result of its absorption of penetrative radiation and a large part of the light provided by said source is outside of a wave length band including light corresponding to the color to which the material changes.

17. A dosimeter as in claim 10 and further comprising means for shielding said element from ambient light.

References Cited in the file of this patent

UNITED STATES PATENTS

| | | |
|---|---|---|
| 894,499 | Hinrichs | July 28, 1908 |
| 1,933,803 | Hickman | Nov. 7, 1933 |
| 1,967,583 | McFarlane et al. | July 24, 1934 |
| 2,060,957 | Tarwin et al. | Nov. 17, 1936 |
| 2,203,352 | Goldmark | June 4, 1940 |
| 2,560,818 | Pierce | July 17, 1951 |
| 2,562,901 | Fischer | Aug. 7, 1951 |
| 2,585,551 | Hofstadter | Feb. 12, 1952 |
| 2,616,051 | Daniels | Oct. 28, 1952 |
| 2,692,952 | Briggs | Oct. 26, 1954 |
| 2,713,116 | Raibourn | July 12, 1955 |
| 2,730,625 | Shurcliff | Jan. 10, 1956 |

FOREIGN PATENTS

| | | |
|---|---|---|
| 17,666 | Great Britain | Sept. 24, 1903 |